US006388444B1

(12) United States Patent
Hahn et al.

(10) Patent No.: US 6,388,444 B1
(45) Date of Patent: *May 14, 2002

(54) ADAPTIVE METHOD FOR DETECTING MISFIRE IN AN INTERNAL COMBUSTION ENGINES USING AN ENGINE-MOUNTED ACCELEROMETER

(75) Inventors: Stephen L. Hahn, Novi; David James Scholl, Huntington Woods, both of MI (US); Kevin Ronald Carlstrom, Fort Wayne, IN (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,469

(22) Filed: Jan. 13, 2000

(51) Int. Cl.[7] .............................. F02P 17/00; F02P 5/00; F02M 7/00
(52) U.S. Cl. .................... 324/378; 123/406.24; 123/435
(58) Field of Search ...................... 324/378; 123/406.24, 123/435, 406.41, 406.42, 406.43; 73/35.03, 35.04, 117.3

(56) References Cited

U.S. PATENT DOCUMENTS

| 4,002,155 | A | * | 1/1977 | Harned et al. ............ 123/406.3 |
| 4,364,260 | A | * | 12/1982 | Chen et al. ................. 73/35.03 |
| 4,433,381 | A | * | 2/1984 | Wilkinson ................... 701/103 |
| 4,471,736 | A | * | 9/1984 | Yoshida et al. .......... 123/406.2 |
| 4,494,509 | A | * | 1/1985 | Long ....................... 123/406.19 |
| 4,643,023 | A | * | 2/1987 | Capps ........................ 73/117.3 |
| 5,095,742 | A | | 3/1992 | James et al. |
| 5,116,259 | A | | 5/1992 | Demizu et al. |
| 5,119,783 | A | | 6/1992 | Komurasaki |
| 5,214,958 | A | | 6/1993 | Inada et al. |
| 5,230,316 | A | * | 7/1993 | Ichihara et al. .......... 123/406.3 |
| 5,263,453 | A | | 11/1993 | Wakahara et al. |
| 5,295,466 | A | * | 3/1994 | Fukui ....................... 123/406.3 |
| 5,392,642 | A | * | 2/1995 | Tao ............................ 73/117.3 |
| 5,415,035 | A | * | 5/1995 | Shimasaki et al. ......... 73/117.3 |
| 5,421,196 | A | | 6/1995 | Angermaier et al. |
| 5,452,699 | A | | 9/1995 | Rossignol |
| 5,504,682 | A | | 4/1996 | Shiraishi et al. |
| 5,505,079 | A | * | 4/1996 | Rossignol .................. 73/117.3 |
| 5,535,722 | A | * | 7/1996 | Graessley et al. ....... 123/406.2 |
| 5,559,285 | A | | 9/1996 | Bryant et al. |
| 5,653,209 | A | * | 8/1997 | Johansson et al. .......... 123/435 |

* cited by examiner

Primary Examiner—Safet Metjahic
Assistant Examiner—Wasseem H. Hamdan
(74) Attorney, Agent, or Firm—Allan J. Lippa

(57) ABSTRACT

A method for detecting misfire in an internal combustion engine comprising the steps of measuring instantaneous angular velocity of the engine crankshaft during combustion in the combustion chamber of a piston and cylinder assembly, determining if combustion has occurred using crankshaft acceleration data, measuring engine block combustion energy vibrations by means of an accelerometer, determining whether combustion has occurred using the accelerometer data, identifying the cylinder where the acceleration data originates, comparing the results of the crankshaft acceleration information with the accelerometer information to detect whether each set of data detects misfire, decreasing the threshold for detecting a misfire using accelerometer data if a misfire is detected only by the crankshaft acceleration data whereby a reliable misfire signal can be obtained during those instances when the crankshaft acceleration data is unreliable and increasing the threshold for the accelerometer when the crankshaft acceleration data indicates no misfire but a misfire is detected by the accelerometer information.

8 Claims, 4 Drawing Sheets

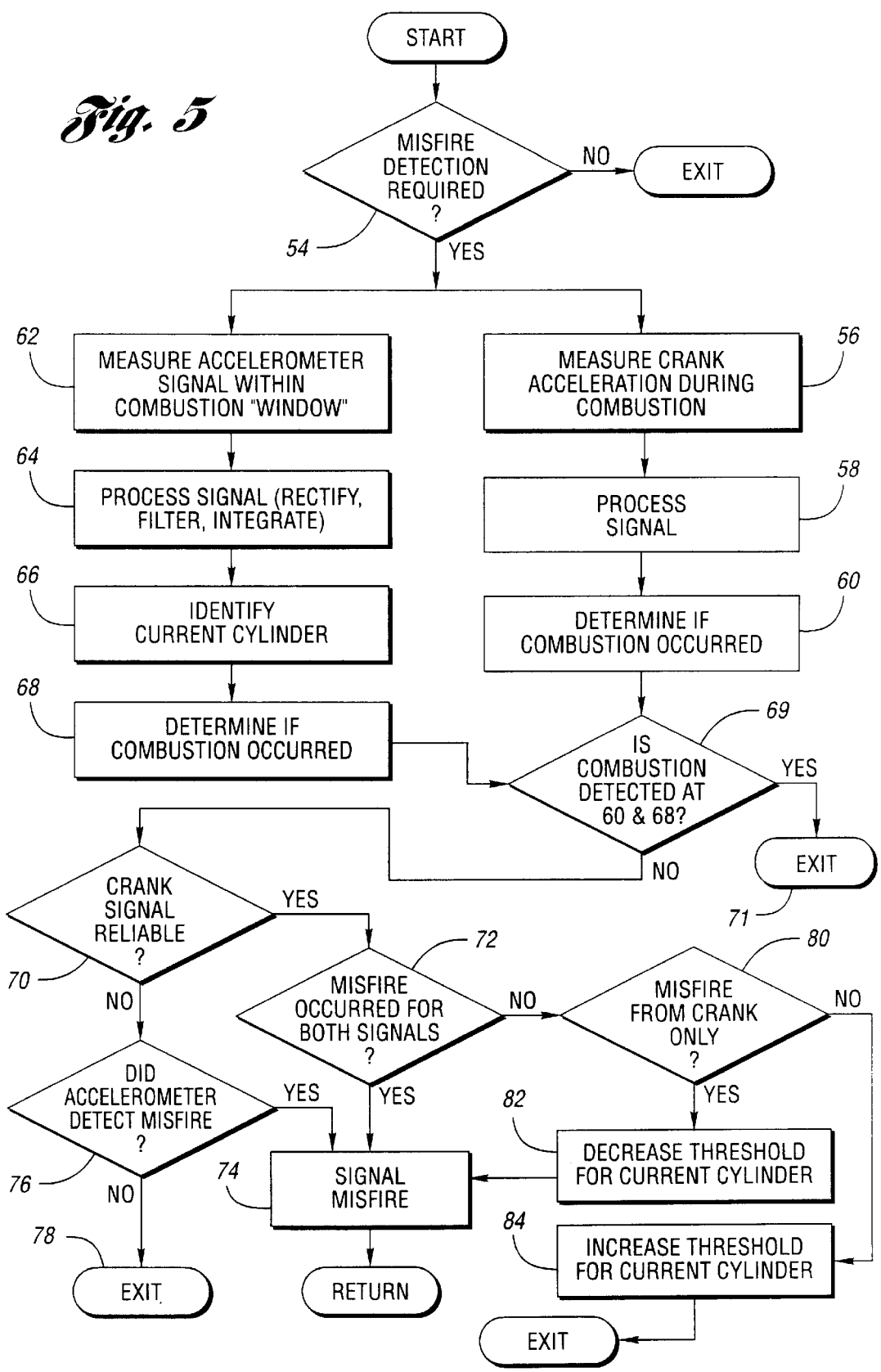

ADAPTIVE METHOD FOR DETECTING MISFIRE IN AN INTERNAL COMBUSTION ENGINES USING AN ENGINE-MOUNTED ACCELEROMETER

Copending patent application Ser. No. 09/482,470, filed Jan. 13, 2000, entitled "Controller And Control Method For An Internal Combustion Engine Using An Engine-Mounted Accelerometer", discloses a controller and a control method for determining indicated mean effective pressure (IMEP) in the combustion chamber of an internal combustion engine without the necessity of using an in cylinder pressure sensor. The strategy for obtaining a reliable indicator of IMEP uses the output of an accelerometer to obtain engine vibration data. The accelerometer is mount ed on the exterior of the engine block. The IMEP can be computed in real time using an electronic engine control microprocessor.

TECHNICAL FIELD

The invention relates to a method for detecting misfire in the combustion chamber of an internal combustion engine.

BACKGROUND ART

This copending patent application is assigned to the assignee of the present application. Its disclosure is incorporated herein by reference.

It is explained in the copending patent application that normal combustion in the combustion chamber results in energy being transferred to the engine housing in the form of vibrations. If the combustion energy varies more than a predetermined amount, corrective action is taken by appropriately adjusting the air/fuel ratio, the spark timing, or the exhaust gas recirculation.

Using the accelerometer, the characteristics of the combustion event can be monitored and corrective action can be taken if the accelerometer data sampled during a defined crankshaft position window in which combustion is known to occur does not conform to a known relationship between accelerometer data and combustion energy during normal combustion.

It is known design practice to identify a misfire by monitoring crankshaft acceleration. This is done by using angular velocity data from a crankshaft position sensor, which can identify a change in acceleration due to combustion as well as absence of combustion. Absence of combustion would be an indicator of a misfire in a particular cylinder. One shortcoming of such prior art systems for identifying misfire using crankshaft acceleration data is that the data is sensitive to driveline induced vibrations resulting from road surface irregularities, gear changes, accessory loads, etc. Such prior art systems are incapable of distinguishing between a filtered crankshaft acceleration output signal caused by a misfire from a similar signal caused by a driveline induced disturbance not associated with a misfire.

DISCLOSURE OF INVENTION

It is an objective of the present invention to provide a misfire detection method for internal combustion engines that is capable of establishing a reliable misfire signal that is distinguished from acceleration data correlated to driveline disturbances not related to a combustion event.

It is a further objective of the invention to provide a reliable misfire detection method wherein a particular cylinder of a multiple cylinder engine can be identified as the source of misfire information.

The method steps include measuring engine vibration energy caused by combustion by processing accelerometer data, measuring instantaneous crankshaft and camshaft positions, determining the combustion chamber of a multiple cylinder engine in which combustion is expected to occur, determining whether combustion has occurred using both accelerometer data and crankshaft acceleration data, and determining whether a misfire has occurred by comparing processed accelerometer data with processed crankshaft position data.

The invention uses some steps of the technique involved in the measurement of mean effective combustion chamber pressure disclosed in the previously identified copending patent application. The present technique requires accelerometer data obtained from an engine mounted accelerometer to be processed simultaneously in parallel relationship with respect to the processing of crankshaft acceleration data obtained from a crankcase angular velocity sensor. Each control routine will determine if combustion has occurred in a particular combustion chamber of the multiple cylinder engine. If misfire appears to have occurred, as demonstrated by the output of each of the routines processed in parallel, then a reliable misfire signal will have been detected. Corrective action then can be taken to eliminate the condition that caused the misfire.

The invention is capable of obtaining a reliable misfire signal throughout the entire range of engine loads rather than in only a narrow range of selected loads, as in certain prior art systems.

If the output of the accelerometer does not detect a misfire but a misfire is detected by crankshaft acceleration data, the adaptive portion of the control routine of the invention will decrease the operating threshold for the measurement of misfire using the accelerometer. If the decrease in the threshold during the next control loop of the microprocessor results in the development of a misfire signal, the misfire signal will be considered to be reliable, and appropriate steps can be taken to eliminate the misfire condition. If the data from the accelerometer results in the determination of a misfire, but the data from the crankshaft acceleration processing routine does not indicate a misfire, the threshold for the accelerometer data is increased. This is a further adaptive step that is carried out in order to ensure reliable detection of a misfire.

BRIEF DESCRIPTION OF DRAWINGS

FIG. 5 is a flow diagram indicating the steps of the control routine for detecting misfire using the improved method of the invention, including the adaptive steps that are used to calibrate the processing of the accelerometer data and the crankshaft acceleration data to ensure a reliable misfire signal.

BEST MODE FOR CARRYING OUT THE INVENTION

Figure 1:
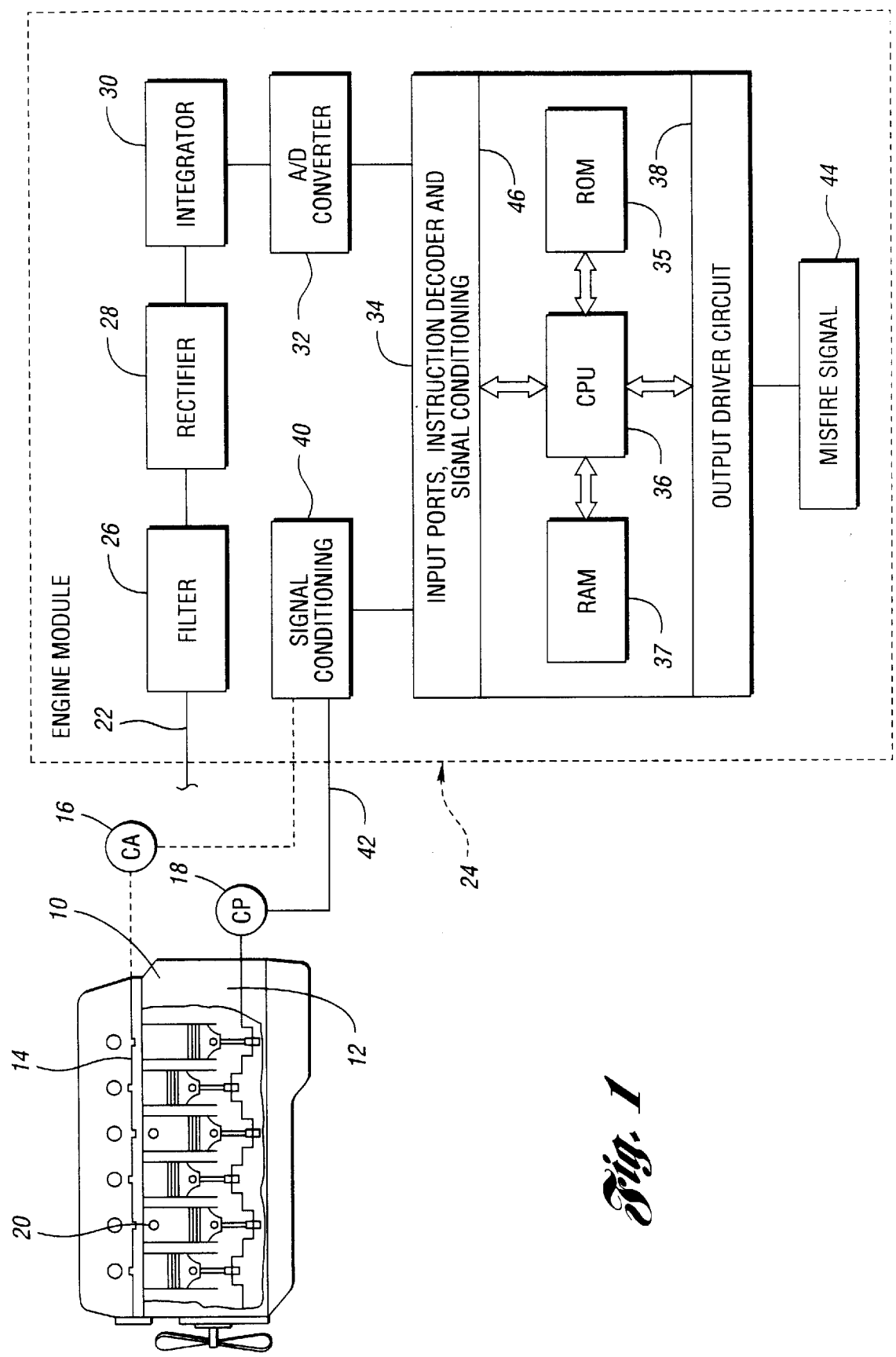
FIG. 1 is a schematic representation of an engine control module forming a part of an automotive driveline controller.

FIG. 1 shows in schematic form an engine control module for an internal combustion engine of the kind described in the copending patent application previously identified.

The internal combustion engine 10 has multiple cylinders formed in the engine housing 12. Each cylinder receives a working piston. Each piston and cylinder assembly defines a combustion chamber.

An overhead valve arrangement is activated by camshaft 14. Each combustion chamber has at least one intake port and at least one exhaust port controlled, respectively, by exhaust and intake valves.

A camshaft angle sensor 16 determines the camshaft angular position. A crankshaft position sensor 18 monitors crankshaft position as each cylinder and piston assembly operates sequentially with an air intake stroke, a compression stroke, a power stroke and an exhaust stroke in known fashion.

An accelerometer 20 is mounted directly on the exterior of the engine housing 12. An accelerometer of this type can be used also in a knock detector control system of the kind shown, for example, in U.S. Pat. No. 5,535,722. The output signal developed by the accelerometer 20 is distributed through signal flow path 22 to engine control microprocessor 24. The engine control microprocessor 24 includes a broadband filter circuit 26, a rectifier circuit 28, an integrator circuit 30, an analog-to-digital converter 32 for converting the analog signal obtained from the accelerometer, and a microcomputer 34. A central processor unit (CPU) 36, a read-only memory (ROM) 35, a random-access memory (RAM) 37, and an output driver circuit 38 are components of the microcomputer 34.

The output of camshaft angle sensor 16 is delivered to the signal conditioning circuit 40 as a digital input signal. A crankshaft position signal from sensor 18 also is distributed to the signal conditioning circuit through signal flow path 42. The output of the driver circuit is a misfire signal at 44.

The output of the driver circuit develops misfire signals at 44.

The accelerometer vibration signal in signal flow path 22 is filtered by the broad band filter 26, rectified at 28, and integrated by integrator circuit 30. It then is converted at 32 to a digital signal before being transferred to the signal conditioning portion 46 of the microcomputer 34.

Figure 2:
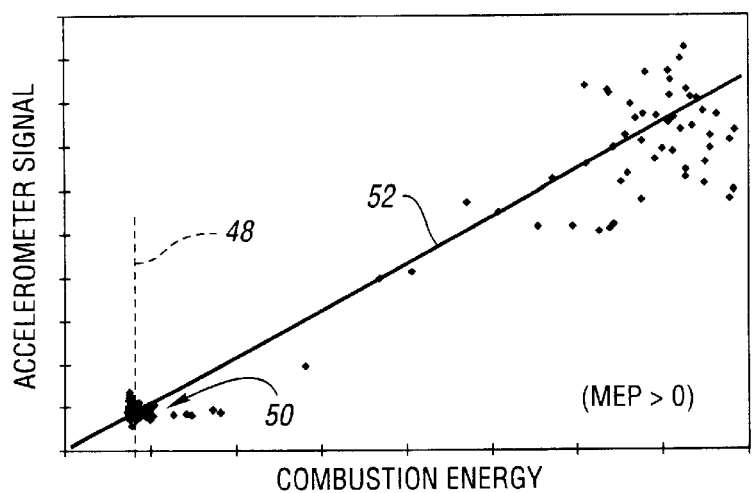
FIG. 2 is a graph showing the relationship between mean effective pressure for a particular combustion chamber and an accelerometer signal from an engine mounted accelerometer when combustion is normal.

FIG. 2 is a plot that shows the relationship between combustion energy and the accelerometer signal. Combustion energy is correlated to mean effective pressure in the combustion chamber. The data in FIG. 2 is collected within a selected window of crank angles where combustion is expected to occur. That window is calibratable because camshaft angle data and crankshaft position data from sensors 16 and 18 can be used to identify the ignition point during the compression stroke for each cylinder. The straight line indicated in FIG. 2 is a trend line showing the relationship between the accelerometer signal and the combustion energy. An increase in the accelerometer signal is correlated to an increase in combustion energy. The readings are characteristic of an engine operating with normal combustion at various load levels.

When misfire occurs, the reading would be to the left of the reference line 48 shown in FIG. 2.

In FIG. 2, the region of minimum load of the engine is indicated at 50. As the load increases, the combustion energy, of course, increases in accordance with the trend line shown at 52.

Figure 3:
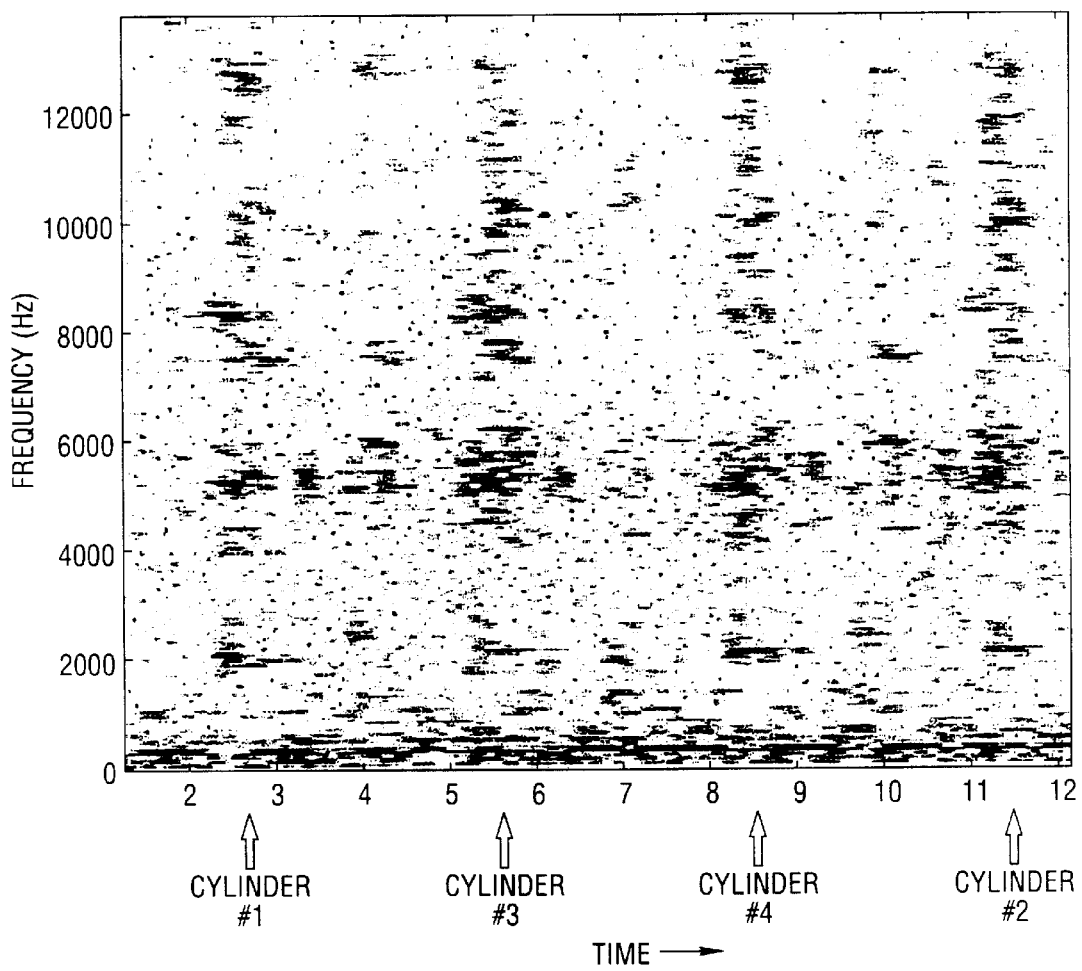
FIG. 3 is a schematic representation of a spectrogram showing the amplitude of accelerometer output signals for a combustion chamber when combustion is not present.

FIG. 3 is a spectrogram that shows the frequency content of the accelerometer signal when combustion is not present. There are four vertical bands in FIG. 3. Each band represents the vibration amplitude throughout a range of frequencies for a particular cylinder. Each band is correlated to a separate cylinder, and the firing sequence for the cylinders corresponds to the firing order for a four-cylinder engine (i.e., 1-3-4-2). The dark areas in the vertical band shown in FIG. 3 are not particularly pronounced at any frequency. They represent merely extraneous vibrations in the driveline created by vibration energy sources not related to combustion.

Figure 4:
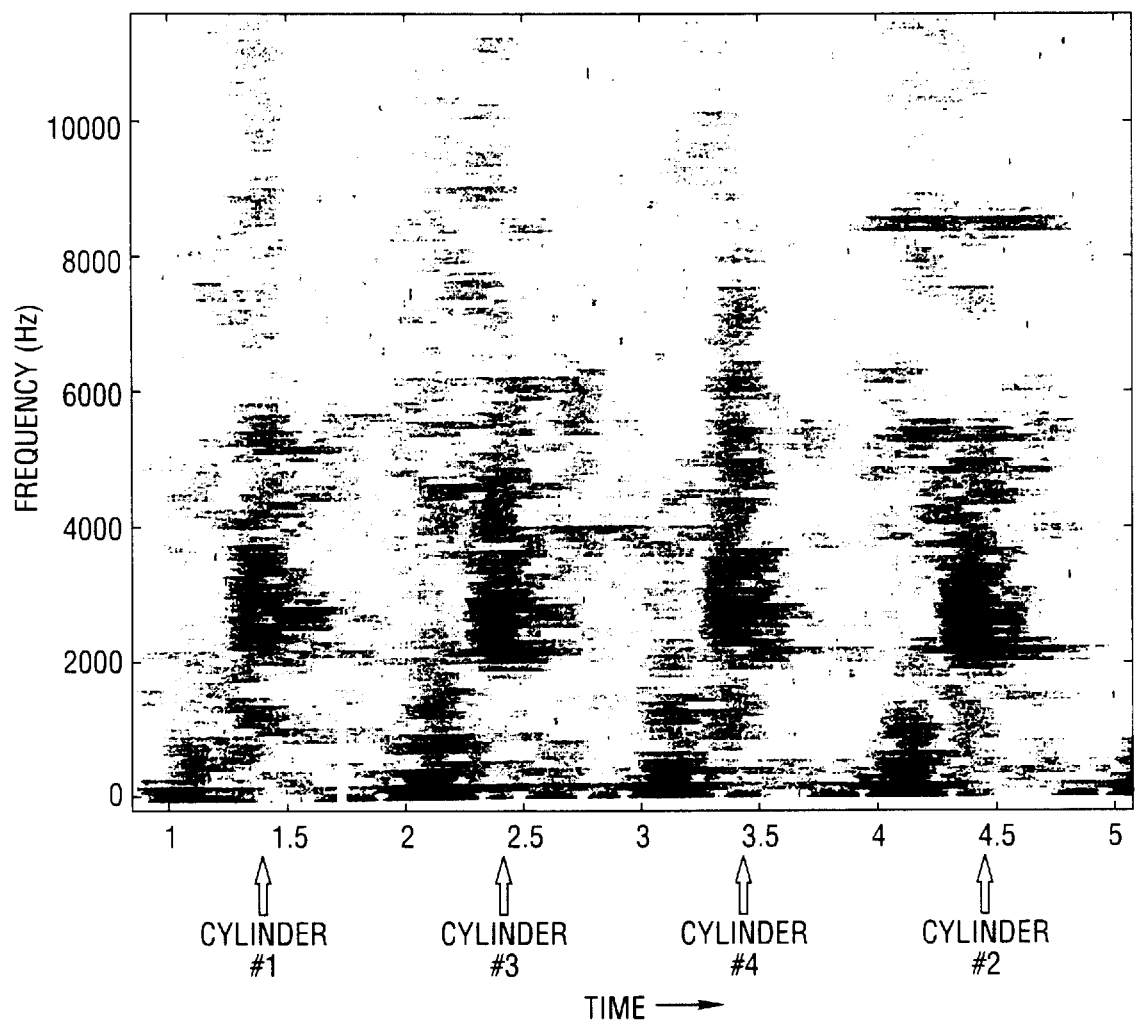
FIG. 4 is a spectrogram corresponding to the spectrogram of FIG. 3, but it shows the amplitude of accelerometer signals in a particular combustion chamber when combustion is present.

In contrast to the spectrogram of FIG. 3, the spectrogram of FIG. 4 shows pronounced dark areas within a frequency range of about 2 KHz to 4.5 KHz. This frequency range may be different for different engines depending on the structural and combustion characteristics of the particular engine. Each dark area of each band indicated in FIG. 4 designates the amplitude of the vibrations. The darker the vibrations, the greater the magnitude of each disturbance. Variations of the amplitudes graphically illustrated by the spectrogram of FIG. 4 is computed using a Fast Fourier Transformation (FFT) computation technique, which is a well known technique.

If the acceleration signal is sampled when combustion is expected to occur, and energy is not present in the form of an engine block vibration, a misfire has occurred. For example, an absence of dark regions in FIG. 4 could indicate a misfire. The vertical lines that determine the darkness of each of the vertical bands, one for each cylinder, are broadband vibration indicators which appear at peak cylinder pressures. As mentioned earlier, the vibration amplitude for this particular engine is higher in the 2 KHz to 4.5 KHz range for each combustion event.

Bandpass filtering of the accelerometer signal at 26 in FIG. 1 allows the frequency content associated with the combustion event to be detected. In practicing the method of the present invention, the signal of the filtered accelerometer values make it possible to verify the information developed using the crank position sensor 18.

FIG. 5 is a flowchart that illustrates the process steps involved in practicing the invention. It is determined initially whether a misfire detection is required. For example, if the objective of the system is to determine whether misfire occurs when the engine is in a predesignated load range, the initial inquiry shown at 54 will be affirmative. If it is desired to detect misfire for all engine loads, the initial inquiry at 54 may be bypassed.

The crankshaft position sensor output can be transferred to the CPU 36 after being conditioned at 40 by the microcomputer. The CPU will compute the second derivative of the signal received from the position sensor 18, which is the angular acceleration.

In FIG. 5, action block 56 indicates measurement of the acceleration signal from the crankshaft position sensor. The processing of the signal, as explained previously, occurs at action block 58. Then a determination is made at 60 as to whether there is sufficient crankshaft acceleration to indicate that combustion has occurred.

The routine previously described for using the accelerometer signal is carried out simultaneously in parallel relationship with respect to the routine for processing the crankshaft acceleration signal. The measurement of the accelerometer signal is indicated at action block 62 as the acceleration data is sampled for each crankshaft position window for each cylinder. That signal is bandpass filtered, rectified and integrated at action block 64. The current cylinder where combustion occurs is identified at action block 66 using camshaft angle information and crankshaft position information. This is necessary for proper determination of the signal threshold.

It then is determined if combustion has occurred by comparing the sampled accelerometer data to the threshold for that cylinder. This is done at action block 68.

If the crankshaft signal and the accelerometer signal both indicate at decision step 69 that combustion has occurred, the routine is exited at 71. No misfire will have been detected. If combustion at both 60 and 64 is not detected, the routine then makes an inquiry at step 70 as to whether the crank signal is reliable. If it is reliable, the routine proceeds to step 72 where an inquiry is made as to whether a misfire was detected in both the accelerometer signal routine and the crank angle acceleration routine. If both routines indicate a misfire, a misfire signal is signaled at 74 and the strategy routine then returns to the starting point.

If the crank angle acceleration routine does not indicate that combustion occurred, an inquiry is made at step 76 as to whether the accelerometer detected a misfire. If the accelerometer did not detect a misfire, the routine exits at 78. If the accelerometer does indicate a misfire, notwithstanding the fact that the crank signal was not reliable, a misfire is signaled at 74. Thus, the accelerometer will provide a useful misfire signal even in those instances when the crank angle sensor is not reliable because of extraneous vibrations in the driveline due to non-combustion related events. For example, the vehicle may drive over a chuck hole in the roadway, which provides an instantaneous change in the crankshaft angular velocity.

If the inquiry at step 72 determines that the misfire did not occur for both signals, the routine proceeds to make an inquiry at step 80 as to whether the misfire detected was from the crankshaft sensor only. That is, if the crankshaft sensor indicates a misfire but the acceleration sensor is below the threshold needed to trigger a misfire signal, the threshold is decreased at action block 82.

If the inquiry at step 80 is negative, that would indicate that the misfire was detected only by the accelerometer and that the threshold for the accelerometer is too low. Since the crank signal is reliable, there then is a need to increase the threshold. Thus, a negative inquiry at step 80 would result in an increase in the threshold for the accelerometer at action block 84.

The routine involving the use of crankshaft a acceleration data thus is used to calibrate the accelerometer data routine. In this way, adaptive misfire detection is established to provide a reliable misfire signal from the accelerometer even in those instances when the crankshaft acceleration data is not reliable.

Although a preferred embodiment of the invention has been disclosed, it will be apparent to persons skilled in the art that modifications may be made without departing from the scope of the invention. All such modifications and improvements thereof are intended to be covered by the following claims.

What is claimed is:

1. An adaptive method for detecting misfire in a combustion chamber of a piston and cylinder assembly for a spark-ignition, automotive, internal combustion engine, the engine having a cylinder housing, a crankshaft and a camshaft, an accelerometer being mounted on the exterior of the cylinder housing;

the method comprising the steps of:
measuring engine combustion vibration energy in a frequency range of about 2 KHz to 4.5 KHz by recording and processing accelerometer output data to detect whether a misfire has occurred;
measuring instantaneous crankshaft and camshaft positions;
determining the location in the combustion cycle at which combustion is expected to occur using instantaneous crankshaft position and camshaft angle data;
determining whether combustion has occurred using accelerometer output data;
determining instantaneous crankshaft acceleration using crankshaft position data;
determining whether combustion has occurred using crankshaft acceleration data, and;
determining whether a misfire in the combustion chamber is detected by comparing processed accelerometer output data with processed crankshaft position data and signaling a misfire if the processed accelerometer output data and the processed crankshaft position data both indicate a misfire.

2. The method set forth in claim 1 wherein the accelerometer output data and the crankshaft position data are processed simultaneously in parallel; and
filtering the accelerometer output data to establish a threshold value for vibration data below which the vibration data does not indicate a misfire.

3. The method set forth in claim 2 including the adaptive step of decreasing the threshold value for accelerometer output data for the identified combustion chamber; and
signaling a misfire if the processed accelerometer output data and the processed crankshaft position data both indicate a misfire following a decrease in the threshold value.

4. The method set forth in claim 2 including the step of increasing the threshold value for accelerometer output data for the identified combustion chamber if a misfire is indicated by the accelerometer output data but is not indicated by the crankshaft position data.

5. An adaptive method for detecting misfire in a combustion chamber of a piston and cylinder assembly for a spark-ignition, automotive internal combustion engine, the engine having a cylinder housing, a crankshaft and a camshaft, an accelerometer being mounted on the exterior of the cylinder housing;

the method comprising the steps of:
measuring engine combustion energy vibrations in a frequency range below about 5 KHz by recording and processing accelerometer output data to detect whether a misfire has occurred;
measuring instantaneous crankshaft and camshaft positions;
determining the location in the combustion cycle in which combustion is expected to occur using instantaneous crankshaft position and camshaft angle data;
determining whether combustion has occurred using accelerometer output data;
determining instantaneous crankshaft acceleration using crankshaft position data;
determining whether combustion has occurred using crankshaft acceleration data, and;
determining whether a misfire in the combustion chamber has occurred by comparing processed accelerometer output data with processed crankshaft position data and signaling a misfire if the processed accelerometer output data and the processed crankshaft position data both indicate a misfire.

6. The method set forth in claim 5 wherein the accelerometer output data and the crankshaft position data are processed simultaneously in parallel; and
filtering the accelerometer output data to establish a threshold value for vibration data below which the vibration data does not indicate a misfire.

7. The method set forth in claim 6 including the adaptive step of decreasing the threshold value for accelerometer output data for the identified combustion chamber; and signaling a misfire if the processed accelerometer output data and the processed crankshaft position data both indicate a misfire following a decrease in the threshold value.

8. The method set forth in claim 6 including the step of increasing the threshold value for accelerometer output data for the identified combustion chamber if a misfire is indicated by the accelerometer output data but is not indicated by the crankshaft position data.

* * * * *